(12) United States Patent
Li et al.

(10) Patent No.: US 11,381,671 B2
(45) Date of Patent: Jul. 5, 2022

(54) TERMINAL DEVICE

(71) Applicants: Chengdu BOE Optoelectronics Technology Co., Ltd., Sichuan (CN); BOE Technology Group Co., Ltd., Beijing (CN)

(72) Inventors: Fan Li, Beijing (CN); Lianbin Liu, Beijing (CN); Huan Meng, Beijing (CN); Mingfang Wang, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 204 days.

(21) Appl. No.: 16/954,573

(22) PCT Filed: Jul. 31, 2019

(86) PCT No.: PCT/CN2019/098535
§ 371 (c)(1),
(2) Date: Jun. 17, 2020

(87) PCT Pub. No.: WO2021/016913
PCT Pub. Date: Feb. 4, 2021

(65) Prior Publication Data
US 2022/0116490 A1    Apr. 14, 2022

(51) Int. Cl.
*H04M 1/02*    (2006.01)
*G01N 21/95*    (2006.01)

(52) U.S. Cl.
CPC .......... *H04M 1/0266* (2013.01); *G01N 21/95* (2013.01); *G01N 2021/9511* (2013.01)

(58) Field of Classification Search
CPC ................ H04M 1/0266; G01N 21/95; G01N 2021/9511
See application file for complete search history.

(56) References Cited

U.S. PATENT DOCUMENTS

2019/0104625 A1    4/2019   Rogers et al.
2019/0245958 A1*   8/2019   Cheng ................... G06F 1/1656
(Continued)

FOREIGN PATENT DOCUMENTS

CN    206490702 U    9/2017
CN    108183983 A    6/2018
(Continued)

OTHER PUBLICATIONS

International search report of PCT application No. PCT/CN2019/098535 dated May 6, 2020.

*Primary Examiner* — Ernest G Tacsik
(74) *Attorney, Agent, or Firm* — Fay Sharpe LLP

(57) ABSTRACT

A terminal device includes: a rear housing, and a photosensitive element disposed on the rear housing; a light-transmissive cover plate provided with an edge window region coated with ink, wherein the edge window region includes a light-transmissive ink region; and a display panel provided with an edge light-transmissive region, wherein at least a portion of the edge light-transmissive region is disposed between the light-transmissive ink region and the photosensitive element, and both the edge light-transmissive region and the light-transmissive ink region are regions transmittable to light.

19 Claims, 3 Drawing Sheets

(56) References Cited

U.S. PATENT DOCUMENTS

| | | | |
|---|---|---|---|
| 2019/0280057 A1* | 9/2019 | Li | ........................ H01L 27/3227 |
| 2019/0280058 A1 | 9/2019 | Li | |
| 2019/0379779 A1* | 12/2019 | Zhang | ............... H04M 1/72454 |
| 2021/0271295 A1* | 9/2021 | Li | .......................... G06F 1/1684 |

FOREIGN PATENT DOCUMENTS

| | | |
|---|---|---|
| CN | 108200231 A | 6/2018 |
| CN | 108418913 A | 8/2018 |
| CN | 108494909 A | 9/2018 |
| CN | 108540595 A | 9/2018 |
| CN | 108600422 A | 9/2018 |

* cited by examiner

TERMINAL DEVICE

The present application is a 371 of PCT Application No. PCT/CN2019/098535, filed on Jul. 31, 2019, the content of which is incorporated herein by reference.

TECHNICAL FIELD

The present disclosure relates to the field of terminal technologies, and more particularly to a terminal device.

BACKGROUND

Currently, for full-screen designs, photosensitive elements, such as infrared radiation sensors, are usually arranged below the screen and disposed on the edge of the screen. In order to avoid shielding of the photosensitive element by the display panel, the display panel and the frame of the mobile phone shall be separated by a distance for the light of the photosensitive element to pass through.

SUMMARY

Embodiments of the present disclosure provide a terminal device. The technical solutions are as follows:

At least one embodiment of the present disclosure provides a terminal device. The device includes:

a rear housing, and a photosensitive element disposed on the rear housing;

a light-transmissive cover plate provided with an edge window region coated with an ink, wherein the edge window region includes a light-transmissive ink region; and a display panel provided with a display region and an edge light-transmissive region surrounding the display region, wherein at least a portion of the edge light-transmissive region is disposed between the light-transmissive ink region and the photosensitive element, and wherein both the edge light-transmissive region and the light-transmissive ink region are regions transmittable to light.

Exemplarily, the edge light-transmissive region is a rectangular frame structure.

In some embodiments of the present disclosure, a width of an overlap between an orthographic projection of the edge light-transmissive region on the light-transmissive cover plate and the light-transmissive ink region in a first direction is greater than about 40% of a width of the edge light-transmissive region; and the first direction is a direction parallel to a widthwise direction of a first side of the edge light-transmissive region, and the first side of the edge light-transmissive region refers to a side where the orthographic projection of the edge light-transmissive region on the light-transmissive cover plate overlaps the light-transmissive ink region.

Exemplarily, the width of the edge light-transmissive region approximately ranges from 0.5 mm to 0.7 mm.

In some embodiments of the present disclosure, a width of the overlap between the orthographic projection of the edge light-transmissive region on the light-transmissive cover plate and the light-transmissive ink region in the first direction is approximately greater than 0.3 mm;

The first direction is a direction parallel to a widthwise direction of a first side of the edge light-transmissive region, and the first side of the edge light-transmissive region refers to a side where the orthographic projection of the edge light-transmissive region on the light-transmissive cover plate overlaps the light-transmissive ink region.

In some embodiments of the present disclosure, the display panel is further provided with a peripheral circuit region, wherein the edge light-transmissive region surrounds the peripheral circuit region;

wherein a portion of an orthographic projection of the peripheral circuit region on the light-transmissive cover plate overlaps the light-transmissive ink region.

In some embodiments of the present disclosure, circuit components are arranged on the peripheral circuit region, wherein a light-transmissive region is defined between the circuit components.

In some embodiments of the present disclosure, an area of the overlap between an orthographic projection of a non-light-transmissive region in the peripheral circuit region on the light-transmissive cover plate and the light-transmissive ink region is approximately less than 40% of an area of the light-transmissive ink region.

Exemplarily, the circuit components include a panel crack detector disposed in the peripheral circuit region and proximal to the edge light-transmissive region, wherein an orthographic projection of the panel crack detector on the light-transmissive cover plate overlaps the light-transmissive ink region.

Exemplarily, the panel crack detector includes at least one metal wire arranged around the display region.

Exemplarily, the photosensitive element is an infrared radiation sensor, and the ink in the light-transmissive ink region is an ink capable of transmitting infrared light.

Exemplarily, the photosensitive element is an ambient light sensor, and the ink in the light-transmissive ink region is an ink capable of transmitting visible light of at least one color in the ambient light.

In some embodiments of the present disclosure, the light-transmissive ink region is circular, square, or rectangular.

Exemplarily, the light-transmissive ink region is a rectangle, wherein a length direction of the rectangle is parallel to a side of the light-transmissive cover plate proximal to the light-transmissive ink region.

Exemplarily, a length the rectangle approximately ranges from 4 mm to 6 mm, and a width of the rectangle approximately ranges from 0.6 mm to 0.8 mm.

In one implementation of embodiments of the present disclosure, the edge window region further includes a non-light-transmissive ink region; and the non-light-transmissive ink region surrounds the light-transmissive ink region.

Exemplarily, a thickness of the ink in the light-transmissive ink region approximately ranges from 3 μm to 5 μm, and a thickness of the ink in the non-light-transmissive ink region approximately ranges from 5 μm to 25 μm.

In some embodiments of the present disclosure, the edge window region includes:

a non-light-transmissive ink disposed in the non-light-transmissive ink region and arranged on the light-transmissive cover plate, and a light-transmissive ink disposed in the light-transmissive ink region and in a portion of the non-light-transmissive ink region, wherein the light-transmissive ink in the light-transmissive ink region is arranged on the light-transmissive cover plate, the light-transmissive ink in the non-light-transmissive ink region is arranged on the non-light-transmissive ink, and the light-transmissive ink in the light-transmissive ink region is arranged integrally with the light-transmissive ink in the non-light-transmissive ink region.

Exemplarily, the light-transmissive ink on the non-light-transmissive ink has a frame-shaped pattern, wherein a maximum width of the frame-shaped pattern is less than about 0.3 mm.

In some embodiments of the present disclosure, an outer edge of the edge light-transmissive region is provided with at least one turn of anti-cracking grooves.

In some embodiments of the present disclosure, the photosensitive element has a base disposed on the rear housing and a photosensitive module disposed on the base, and an orthographic projection of the photosensitive module on the light-transmissive cover plate is in the light-transmissive ink region.

DETAILED DESCRIPTION

For clearer descriptions of the objectives, technical solutions and advantages in the present disclosure, the present disclosure is described in detail below in combination with the accompanying drawings. Apparently, the described embodiments are merely some embodiments, rather than all embodiments, of the present disclosure. Based on the embodiments of the present disclosure, all other embodiments derived by a person of ordinary skill in the art without creative efforts shall fall within the protection scope of the present disclosure.

In the related art, a distance is present between the display panel and the frame of the mobile phone for the light of the photosensitive element to pass through. This design makes the frame of the screen wider, which fails to meet the requirements on design of a narrow frame.

Figure 1:
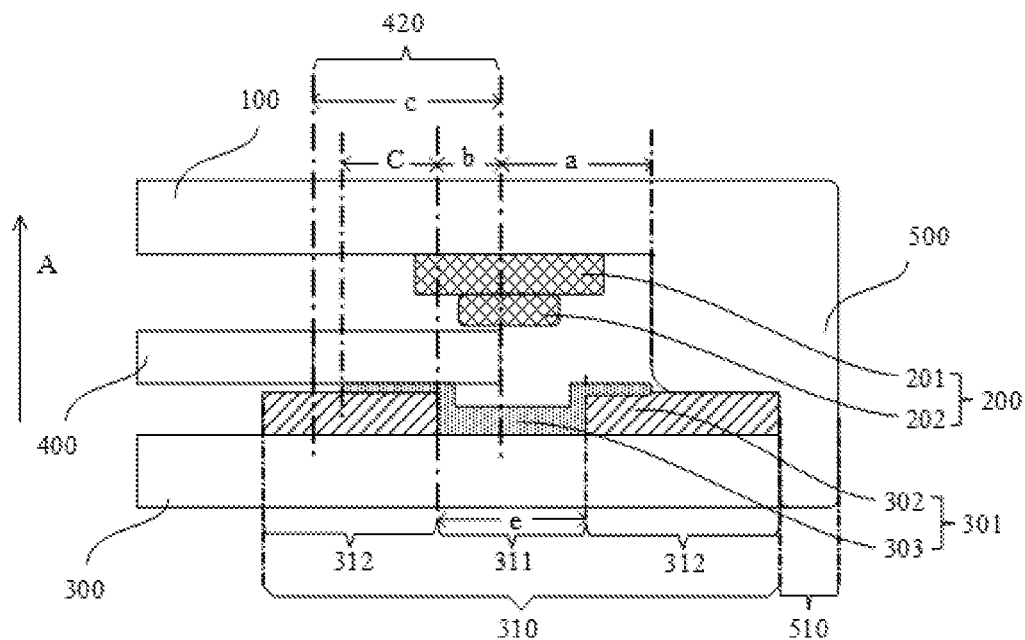
FIG. 1 is a structural diagram of a terminal device according to an embodiment of the present disclosure.

FIG. 1 is a structural diagram of a terminal device according to an embodiment of the present disclosure. With reference to FIG. 1, the terminal device includes: a rear housing 100, a photosensitive element 200, a light-transmissive cover plate 300, and a display panel 400. The photosensitive element 200 is disposed on the rear housing 100.

The light-transmissive cover plate 300 is provided with an edge window region 310 coated with an ink 301, and the edge window region 310 includes a light-transmissive ink region 311.

Figure 2:
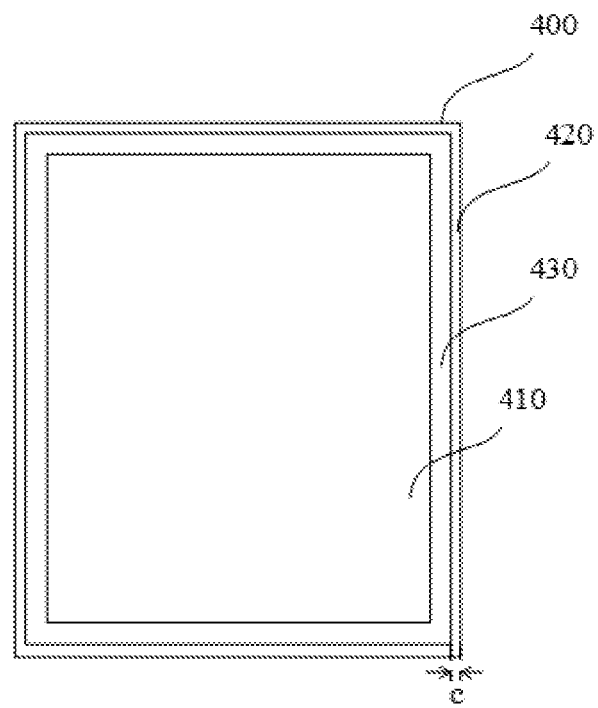
FIG. 2 is a structural diagram of a display panel according to an embodiment of the present disclosure.

FIG. 2 is a structural diagram of a display panel according to an embodiment of the present disclosure. With reference to FIG. 2, the display panel 400 has a display region 410 and an edge light-transmissive region 420 surrounding the display region 410. Both the edge light-transmissive region 420 and the light-transmissive ink region 311 are regions transmittable to light.

In a direction A perpendicular to the light-exiting surface of the display panel 400, at least a portion of the edge light-transmissive region 420 is disposed between the light-transmissive ink region 311 and the photosensitive element 200.

Here, the edge window region 310 of the light-transmissive cover plate 300 is intended to shield the periphery of the display panel 400 and prevent the user from seeing structures such as the peripheral circuit of the display panel 400.

In the terminal device, the display panel is provided with an edge light-transmissive region, and at least a portion of the edge light-transmissive region is disposed between the light-transmissive ink region of the light-transmissive cover plate and the photosensitive element. That is, a portion of the display panel may be arranged to overlap the photosensitive element. Due to light transmission in the edge light-transmissive region, the normal use of the photosensitive element will not be affected. Therefore, it is not necessary to arrange the photosensitive element at the gap between the display panel and the frame of the mobile phone, such that the distance between the display panel and the frame of the device may be reduced, thus the width of the frame on the screen side of the terminal device may be reduced, which is conducive to the realization of the narrow frame design.

For example, in the structure in FIG. 1, the distance between the display panel 400 and the frame 500 of the terminal device is a, while in the related art, the distance between the display panel 400 and the frame 500 of the terminal device is a+b, as shown in FIG. 1. As can be seen from FIG. 1, compared with the related art, the distance between the display panel 400 and the frame 500 of the terminal device is reduced by b in the present disclosure, that is, the width of the frame on the screen side of the terminal device may be reduced by b, thereby realizing the narrow frame design.

In the embodiment of the present disclosure, the rear housing 100, the light-transmissive cover plate 300, and the frame 500 form a box-shaped structure. Both the display panel 400 and the photosensitive element 200 are disposed inside the box-shaped structure. As the edge window region 310 of the light-transmissive cover plate 300 is disposed at the edge of the light-transmissive cover plate 300, accordingly, the photosensitive element 200 is also arranged proximal to the frame 500.

In FIG. 1, a stepped structure is adopted for the frame 500. When the light-transmissive cover plate 300 is assembled with the frame 500, the light-transmissive cover plate 300 is assembled together with the step of the frame 500. At this moment, the light-exiting surface of the light-transmissive cover plate 300 and the front end surface 510 of the frame 500 are in the same plane. The edge window region 310 of the light-transmissive cover plate 300 and the front end surface 510 of the frame 500 together form the edge window region of the terminal device.

In other embodiments, the display panel 400 may also be an organic light emitting diode (OLED) panel, which is usually used as the panel of a full-screen terminal device. For example, the display panel 400 may be an active matrix OLED (AMOLED) panel.

In other embodiments, the display panel may also be one of other types of display panels such as a liquid crystal display (LCD) panel, a quantum dot light emitting diode (QLED) panel and the like.

As shown in FIG. 1, the photosensitive element 200 has a base 201 and a photosensitive module 202. The base 201 is fixed on the rear housing 100, and the photosensitive module 202 is fixed on the base 201.

As shown in FIG. 1, the photosensitive module 202 is used to receive light passing through the light-transmissive ink region 311, such as ambient light, infrared light and the like. An orthographic projection of the photosensitive module 202 on the light-transmissive cover plate 300 falls within the light-transmissive ink region 311. Here, the orthographic projection of the photosensitive module 202 on the light-transmissive cover plate 300 falls within the light-transmissive ink region 311, which may mean that both of them are completely overlapped with each other, or that the orthographic projection of the photosensitive module 202 on the light-transmissive cover plate 300 is wrapped by the light-transmissive ink region 311. With the above definition, it may be ensured that the light emitted or received by the photosensitive element 200 may smoothly pass through the light-transmissive ink region 311.

Exemplarily, the photosensitive element 200 is an infrared radiation sensor (an IR sensor), and the ink in the light-transmissive ink region 311 is an ink capable of transmitting infrared light, that is, an IR ink. In this embodiment, the photosensitive element is an IR sensor, and the ink in the light-transmissive ink region is an ink capable of transmitting infrared light, such that the normal operation of the IR sensor is ensured. Here, the ink capable of transmitting infrared light refers to an ink that has a high transmittance for light with a wavelength in the infrared wavelength band and has a low transmittance for light with other wavelengths.

Exemplarily, the photosensitive element 200 is an ambient light sensor, and the ink in the light-transmissive ink region is an ink capable of transmitting visible light of at least one color in the ambient light. In this implementation, the photosensitive element is an ambient light sensor, and the ink in the light-transmissive ink region is an ink capable of transmitting visible light of at least one color in the ambient light, such that the normal operation of the ambient light sensor is ensured.

In addition to both of photosensitive elements in the above examples, it is not defined in the present disclosure that the photosensitive element may be one of other types of photosensitive elements, as long as the corresponding type of light is capable of passing through the light-transmissive ink region.

FIG. 1 shows only the case of one photosensitive element. In other embodiments, the number of photosensitive elements in the terminal device may also be greater than 1. In this case, each photosensitive element is arranged in the fashion shown in FIG. 1.

FIG. 1 is a schematic partial sectional view of the terminal device, which shows only the structure of a frame proximal to a side of the terminal device, and the photosensitive element 200 is arranged proximal to the frame at the side. The structure shown in FIG. 1 may also be adopted as the structure of the frame near other sides of the terminal device, or the structure shown in FIG. 1 may not be adopted as the structure of frame proximal to other sides of the terminal device, for example, the photosensitive element 200 and the light-transmissive ink region 311 are not arranged, and the display panel 400 and the frame 500 may be arranged proximal to each other.

With reference to FIG. 2, the edge light-transmissive region 420 of the display panel 400 is a rectangular frame structure.

The edge light-transmissive region 420 may be a crack-proof region, and no circuit is arranged in this region, and the function thereof is to prevent cracks generated by cutting from affecting the display panel.

The film structure of the crack-proof region is mainly base substrate and insulating film layers (such as silicon dioxide, silicon nitride, and other organic insulating film layers) disposed thereon, and the structures thereof are transparent. Therefore, the crack-proof region is a light-transmissive region.

As shown in FIG. 2, the edge light-transmissive region 420 includes four sides, and each side is arranged on the edge of the display panel 400.

In other embodiments, the edge light-transmissive region 420 may be arranged only on one side of the display panel, and the edge light-transmissive region 420 is a rectangle, a circle, or one of other shapes.

For example, the edge light-transmissive region 420 may have the same shape and region as the light-transmissive ink region 311, and an orthographic projection of the edge light-transmissive region 420 on the light-transmissive cover plate 300 completely overlaps the light-transmissive ink region 311.

In the embodiment of the present disclosure, a width of the overlap between the orthographic projection of the edge light-transmissive region 420 on the light-transmissive cover plate 300 and the light-transmissive ink region 311 in the first direction is greater than about 40%, for example 40%~50%, of the width of the edge light-transmissive region 420.

The first direction is a direction parallel to a widthwise direction of a first edge of the edge light-transmissive region 420, and the first edge of the edge light-transmissive region 420 refers to an edge where the orthographic projection of the edge light-transmissive region on the light-transmissive cover plate 300 overlaps the light-transmissive ink region 311.

Here, by defining the width of the overlapping part between the edge light-transmissive region and the light-transmissive ink region to be greater than about 40% of the width of the edge light-transmissive region 420, the spacing between the display panel and the frame may be reduced by greater than about 40% of the width of the edge light-transmissive region 420 compared with the related art, such that the design of the narrow frame is ensured.

With reference again to FIG. 2, the width c of the edge light-transmissive region 420 has a value ranging about from 0.5 mm to 0.7 mm. Exemplarily, the width of each side of the edge light-transmissive region 420 may be equal. In other embodiments, the widths of at least two sides of the edge light-transmissive region 420 are unequal.

Here, the term "about" means that the value may fluctuate between plus and minus 5%, for example, in the range of 0.5 mm to 0.7 mm above, 0.5 and 0.7 at both ends may fluctuate in the above-mentioned manner.

For example, the width c of the four sides of the edge light-transmissive region 420 is about 0.6 mm. The width of the light-transmissive region shall neither be set too large, which will affect the design of the narrow frame, nor be set too small, which will result in failure to meet the requirements of the photosensitive element. At the same time, the width design of the above-mentioned edge light-transmissive region may also meet the requirements of the display panel for crack proofing.

With reference again to FIG. 1, the range of the width b of the overlapping part between the orthographic projection of the edge light-transmissive region 420 on the light-transmissive cover plate 300 and the light-transmissive ink region 311 is greater than about 0.3 mm, and a maximum value is the width of the light-transmissive ink region 311.

In this embodiment, the width of the portion overlapped by the edge light-transmissive region and the light-transmissive ink region is defined to be greater than about 0.3 mm, such that the spacing between the display panel and the frame is reduced by at least 0.3 mm compared with the related art, thereby ensuring the design of the narrow frame.

With reference again to FIG. 2, the display panel 400 further includes a peripheral circuit region 430, and the edge light-transmissive region 420 surrounds the peripheral circuit region 430. The peripheral circuit region 430 may also be a rectangular frame structure.

In other embodiments, the peripheral circuit region 430 may also be arranged only on two opposite sides or one side of the display panel 400, which is not limited in this disclosure.

In the display panel 400, the region disposed at the center is the display region 410, and the function of the display region 410 is for screen display.

In the embodiment of the present disclosure, the edge window region 310 simultaneously covers the peripheral circuit region 430 and the edge light-transmissive region 420 to shield the peripheral circuit region 430 and the edge light-transmissive region 420.

Here, the ink 301 coated on the edge window region 310 is black in order to ensure the shielding effect.

Figure 3:
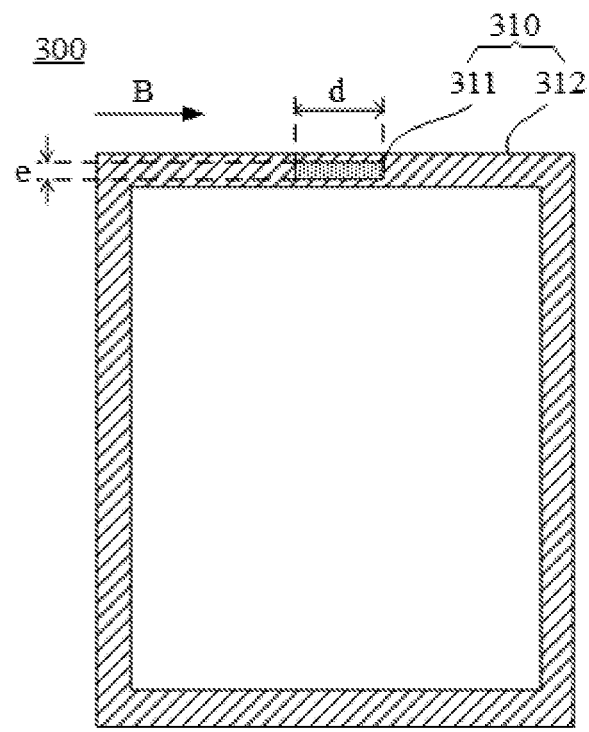
FIG. 3 is a structural diagram of a light-transmissive cover plate according to an embodiment of the present disclosure.

FIG. 3 is a schematic structural diagram of a light-transmissive cover plate according to the embodiments of the present disclosure. With reference to FIG. 3, the edge window region 310 of the light-transmissive cover plate 300 is a rectangular frame structure, such that the peripheral circuit region 430 and the edge light-transmissive region 420 in FIG. 2 may be shielded.

In the embodiment of the present disclosure, the edge window region 310 includes four sides, and each side is arranged on the edge of the light-transmissive cover plate 300. The light-transmissive ink region 311 is arranged on one side of the edge window region 310.

Exemplarily, the light-transmissive ink region 311 is a rectangle, and the length direction B of the rectangle is parallel to one side of the light-transmissive cover plate 300 near the light-transmissive ink region 311. The length direction of the light-transmissive ink region is set to be parallel to one side of the light-transmissive cover plate near the light-transmissive ink region, such that the width of the frame occupied by the light-transmissive ink region is small, which facilitates practice of the narrow frame design.

In the embodiment of the present disclosure, the length d of the light-transmissive ink region 311 approximately ranges from 4 mm to 6 mm, and the width e ranges about from 0.6 mm to 0.8 mm.

For example, the length d of the rectangle is about 5 mm, and the width e of the rectangle is about 0.7 mm. This size design can not only ensure the normal light transmission requirements of the photosensitive element but also realize the design of the narrow frame.

In other embodiments, the light-transmissive ink region 311 may also be a circle or a square, and the aforementioned rectangular or circular and square light-transmissive ink regions herein may be used to facilitate design and manufacturing. Here, the value of the side length of the square or the diameter of the circle ranges about 2 mm to 3 mm As shown in FIG. 3, the edge window region 310 further includes a non-light-transmissive ink region 312; and the non-light-transmissive ink region 312 surrounds the light-transmissive ink region 311. The black ink is designed respectively for the light-transmissive and non-light-transmissive regions. Since the non-light-transmissive black ink has a lower cost than the light-transmissive black ink, the non-light-transmissive black ink is used in the region that is not directly opposite to the photosensitive element, in order to lower the cost.

With reference again to FIG. 1, the thickness of the ink in the light-transmissive ink region 311 ranges approximately from 3 μm to 5 μm, and the thickness of the ink in the non-light-transmissive ink region 312 approximately ranges from 5 μm to 25 μm. The light-transmissive ink is expensive and shall be light-transmissive, and thus may be coated with a thin coating. The non-light-transmissive ink shall be light-shielding, and thus may be coated with a thick coating.

The thickness here refers to the thickness in a direction perpendicular to the light-transmissive cover plate 300.

As shown in FIG. 1, the edge window region 310 includes: the non-light-transmissive ink 302 disposed in the non-light-transmissive ink region 312 and arranged on the light-transmissive cover plate 300, and the light-transmissive ink 303 disposed in the light-transmissive ink region 311 and in a portion of the non-light-transmissive ink region 312, wherein light-transmissive ink 303 in the light-transmissive ink region 311 is arranged on the light-transmissive cover plate 300, the light-transmissive ink 303 in the non-light-transmissive ink region 312 is arranged on the non-light-transmissive ink 302, and the light-transmissive ink 303 in the light-transmissive ink region 311 is arranged integrally with the light-transmissive ink 303 in the non-light-transmissive ink region 312. The light-transmissive ink 303 of the non-light-transmissive ink region 312 is usually overflowed from the light-transmissive ink region 311 to the non-light-transmissive ink region 312.

Figure 4:
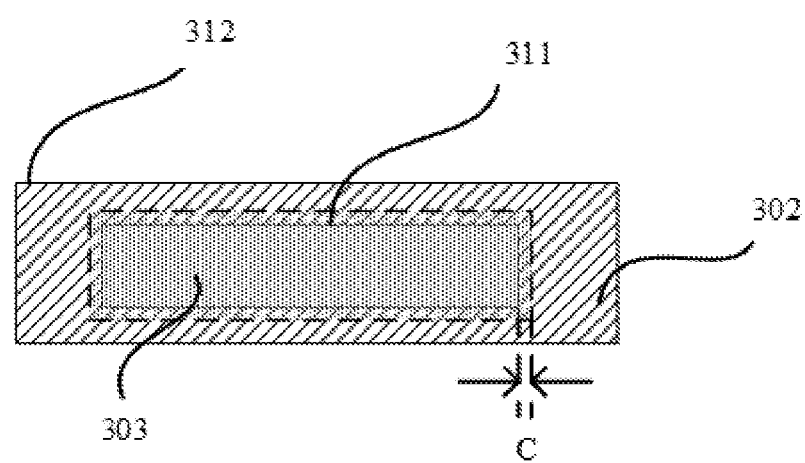
FIG. 4 is a partial structural diagram of a light-transmissive ink region according to the embodiments of the present disclosure.

FIG. 4 is a schematic partial structural diagram of a light-transmissive ink region according to an embodiment of the present disclosure. With reference to FIG. 4, as shown in FIG. 4, the light-transmissive ink 303 overflowed from the light-transmissive ink region 311 to the non-light-transmissive ink region 312 is in a frame shape, and the maximum width C of the light-transmissive ink 303 on the non-light-transmissive ink 302 is approximately less than 0.3 mm. As the light-transmissive ink is costly, its overflowed amount shall be limited.

Exemplarily, when the light-transmissive ink region 311 is rectangular, the shape of the frame is also rectangular.

Figure 5:
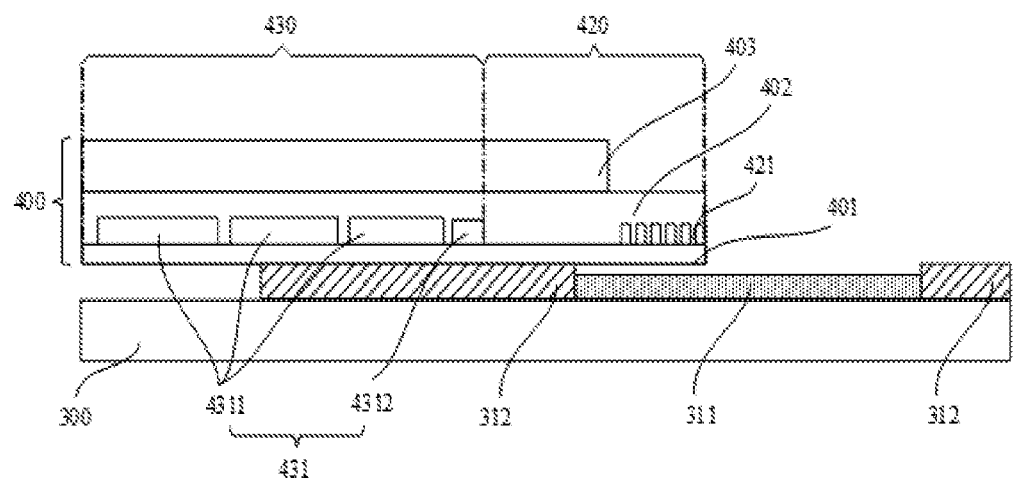
FIG. 5 is a partial structural diagram of a terminal device according to an embodiment of the present disclosure.

FIG. 5 is a schematic partial structural diagram of a terminal device according to an embodiment of the present disclosure. With reference to FIG. 5, a portion of the orthographic projection of the edge light-transmissive region 420 on the light-transmissive cover plate 300 overlaps the light-transmissive ink region 311.

The outer edge of the edge light-transmissive region 420 is provided with at least one turn of anti-cracking grooves 421. The anti-crack groove 421 is formed by etching the organic light-transmissive material of the edge light-transmissive region 420 with an etching process, and it is light-transmissive. The anti-cracking groove may prevent the cracks at the cutting point from extending into the display panel when the display panel is cut by laser, to avoid the cracks generated by cutting from affecting the display pane.

Generally, five or six anti-cracking grooves are provided on the outer edge of the edge light-transmissive region 420, and each of them is arranged in a turn.

Figure 6:
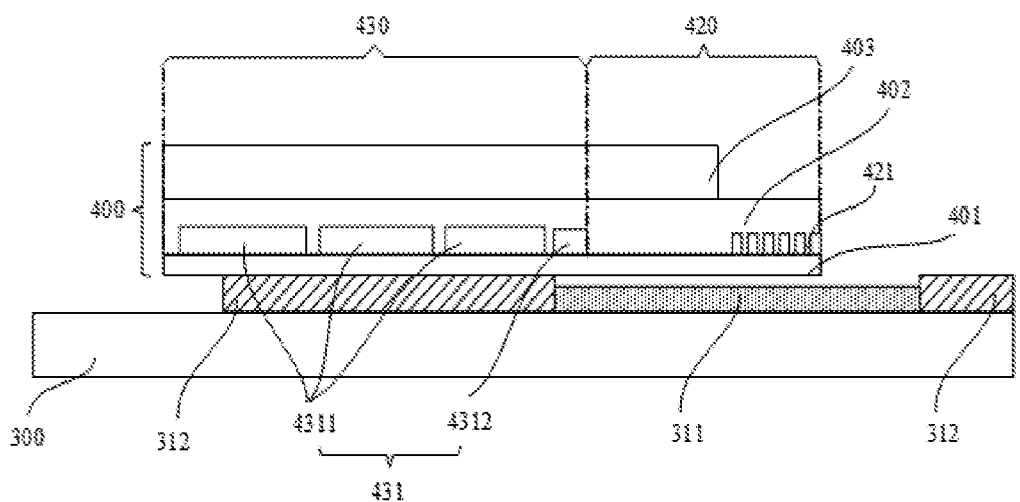
FIG. 6 is a partial structural diagram of another terminal device according to an embodiment of the present disclosure.

FIG. 6 shows a schematic partial structural diagram of another terminal device according to the embodiments of the present disclosure. With reference to FIG. 6, in addition that the orthographic projection of the edge light-transmissive region 420 on the light-transmissive cover plate 300 overlaps the light-transmissive ink region 311, a portion of the orthographic projection of the peripheral circuit region 430 on the light-transmissive cover plate 300 also overlaps the light-transmissive ink region 311.

In this embodiment, the peripheral circuit region partially overlaps the light-transmissive ink region, such that the spacing between the display panel and the frame may be further reduced; at the same time, because at least a portion of the edge light-transmissive region is disposed between the light-transmissive ink region and the photosensitive element, this may ensure the normal light transmission requirements of the photosensitive element.

With reference to FIGS. 5 and 6, circuit components 431 are arranged on the peripheral circuit region 430, and a light-transmissive region is defined between the circuit components 431. For example, all regions between circuit components 431 are light-transmissive, or a part of regions between circuit components 431 are light-transmissive.

As the peripheral circuit is light-transmissive, more parts of the peripheral circuit may overlap the light-transmissive ink region, which reduces the spacing between the display panel and the frame.

Here, the circuit components 431 include, but are not limited to, a gate on array (GOA) circuit 4311, a panel crack detection (PCD) device 4312, or the like. These are all made of a metal and are non-light-transmissive regions in the peripheral circuit region 430. The PCD 4312 is proximal to the edge light-transmissive region 420.

Exemplarily, the PCD device 4312 may be at least one metal wire arranged around the display region 410. The edge light-transmissive region 420 is a region from the outer edge of the PCD device 4312 to the outer edge of the display panel.

For example, in FIG. 6, in addition to the edge light-transmissive region 420, an orthographic projection of the PCD device 4312 falls on the edge of the peripheral circuit region 430 on the light-transmissive cover plate 300 also overlaps the light-transmissive ink region 311. The width of the PCD device 4312 is about 0.05 mm.

Exemplarily, the GOA circuit 4311 may include a gate and reset (G&R) GOA, an emitting management (EM) GOA, and the like, and may also include a negative voltage signal (VSS) line and the like.

As shown in FIGS. 5 and 6, the circuit components 431 and the aforementioned anti-cracking grooves 421 of the display panel are both arranged on the base substrate 401, and the circuit components 431 and the aforementioned anti-cracking grooves 421 are covered by a planarization (PLN) layer 402 and a thin film encapsulation (TFE) layer 403.

However, the structures in FIGS. 5 and 6 are only schematic diagrams. In fact, there are other film layer structures between the base substrate 401 and the planarization layer 402, such as an inkjet printing (IJP) layer, a pixel definition layer (PDL) and the like.

In the embodiment of the present disclosure, the overlap between the non-light-transmissive region in the peripheral circuit region 430 and the light-transmissive ink region shall be less than a certain proportion, to prevent the light-shielding region of the non-light-transmissive region from being too large and resulting in that the photosensitive element fails to work normally. Here, the normal operation of the photosensitive element may be ensured as long as the uncovered part of the light-transmissive ink region exceeds a certain proportion.

Exemplarily, an area of an overlap between an orthographic projection of a non-light-transmissive region in the peripheral circuit region 430 on the light-transmissive cover plate 300 and the light-transmissive ink region 311 is approximately less than 40% of an area of the light-transmissive ink region 311. In this way, not only the spacing between the display panel and the frame is sufficiently small, but also the normal light transmission requirements of the photosensitive element are accommodated.

The structures shown in FIGS. 1, 5 and 6 are all semi-shielding structures, that is, the display panel only covers a portion of the light-transmissive ink region. In other embodiments, the display panel may also completely shield the transparent ink region, as long as it may be ensured that the area of the overlap between the orthographic projection of the light-transmissive region of the display panel on the light-transmissive cover plate 300 and the light-transmissive ink region 311 is approximately less than 40% of the area of the light-transmissive ink region 311.

Other embodiments of the present disclosure will be apparent to those skilled in the art from consideration of the specification and practice of the present disclosure. This application is intended to cover any variations, uses, or adaptations of the present disclosure following the general principles thereof and including common knowledge or commonly used technical measures which are not disclosed herein. The specification and embodiments are to be considered as exemplary only, and the true scope and spirit of the present disclosure are indicated by the following claims.

It will be appreciated that the present disclosure is not limited to the exact construction that has been described above and illustrated in the accompanying drawings, and that, various modifications and changes may be made without departing from the scope thereof. It is intended that the scope of the present disclosure is only limited by the appended claims.

What is claimed is:

1. A terminal device, comprising:
a rear housing, and a photosensitive element disposed on the rear housing;
a light-transmissive cover plate provided with an edge window region coated with an ink and surrounding a perimeter of the light-transmissive cover plate, wherein the edge window region comprises a light-transmissive ink region, a non-light-transmissive ink region surrounding the light-transmissive ink region, a non-light-transmissive ink disposed in the non-light-transmissive ink region and a light-transmissive ink disposed in the light-transmissive ink region and in a portion of the non-light-transmissive ink region; and
a display panel provided with a display region and an edge light-transmissive region surrounding the display region, wherein at least a portion of the edge light-transmissive region is disposed between the light-transmissive ink region and the photosensitive element;
wherein both the edge light-transmissive region and the light-transmissive ink region are region transmittable to light.

2. The terminal device according to claim 1, wherein the edge light-transmissive region is a rectangular frame structure.

3. The terminal device according to claim 2, wherein a width of an overlap between an orthographic projection of the edge light-transmissive region on the light-transmissive cover plate and the light-transmissive ink region in a first direction is greater than 40% of a width of the edge light-transmissive region;
wherein the first direction is a direction parallel to a widthwise direction of a first side of the edge light-transmissive region, the first side of the edge light-transmissive region referring to a side where the orthographic projection of the edge light-transmissive region on the light-transmissive cover plate overlaps the light-transmissive ink region.

4. The terminal device according to claim 2, wherein an outer edge of the edge light-transmissive region is provided with at least one turn of anti-cracking grooves.

5. The terminal device according to claim 3, wherein the width of the edge light-transmissive region ranges from 0.5 mm to 0.7 mm.

6. The terminal device according to claim 5, wherein a width of the overlap between the orthographic projection of the edge light-transmissive region on the light-transmissive cover plate and the light-transmissive ink region in the first direction is greater than 0.3 mm.

7. The terminal device according to claim 1, wherein the display panel is further provided with a peripheral circuit region, the edge light-transmissive region surrounding the peripheral circuit region;
wherein a portion of an orthographic projection of the peripheral circuit region on the light-transmissive cover plate overlaps the light-transmissive ink region.

8. The terminal device according to claim 7, wherein circuit components are arranged on the peripheral circuit region, a light-transmissive region being defined between the circuit components.

9. The terminal device according to claim 8, wherein an area of an overlap between an orthographic projection of a non-light-transmissive region in the peripheral circuit region on the light-transmissive cover plate and the light-transmissive ink region is less than 40% of an area of the light-transmissive ink region.

10. The terminal device according to claim 8, wherein the circuit components comprise a panel crack detector disposed in the peripheral circuit region and proximal to the edge light-transmissive region, an orthographic projection of the panel crack detector on the light-transmissive cover plate overlapping the light-transmissive ink region.

11. The terminal device according to claim 1, wherein the photosensitive element is an infrared radiation sensor, and the ink in the light-transmissive ink region is an ink capable of transmitting infrared light.

12. The terminal device according to claim 1, wherein the photosensitive element is an ambient light sensor, and the ink in the light-transmissive ink region is an ink capable of transmitting visible light of at least one color in the ambient light.

13. The terminal device according to claim 1, wherein the light-transmissive ink region is circular, square, or rectangular.

14. The terminal device according to claim 13, wherein the light-transmissive ink region is a rectangle, and a length direction of the rectangle is parallel to one side of the light-transmissive cover plate proximal to the light-transmissive ink region.

15. The terminal device according to claim 14, wherein a length the rectangle ranges from 4 mm to 6 mm, and a width of the rectangle ranges from 0.6 mm to 0.8 mm.

16. The terminal device according to claim 1, wherein a thickness of the ink in the light-transmissive ink region ranges from 3 µm to 5 µm, and a thickness of the ink in the non-light-transmissive ink region approximately ranges from 5 µm to 25 µm.

17. The terminal device according to claim 1, wherein
the non-light-transmissive ink is arranged on the light-transmissive cover plate, and the light-transmissive ink in the light-transmissive ink region is arranged on the light-transmissive cover plate, the light-transmissive ink in the non-light-transmissive ink region is arranged on the non-light-transmissive ink, and the light-transmissive ink in the light-transmissive ink region is arranged integrally with the light-transmissive ink in the non-light-transmissive ink region.

18. The terminal device according to claim 17, wherein the light-transmissive ink on the non-light-transmissive ink has a frame-shaped pattern, a maximum width of the frame-shaped pattern being less than 0.3 mm.

19. The terminal device according to claim 1, wherein the photosensitive element is provided with a base disposed on the rear housing and a photosensitive module disposed on the base, an orthographic projection of the photosensitive module on the light-transmissive cover plate falls within the light-transmissive ink region.

* * * * *